Jan. 13, 1925.

W. W. ROBINSON

IMPLEMENT HANDLE

Filed June 23, 1924

1,523,083

INVENTOR.
William W. Robinson
by John W. Strehli
ATTORNEY

Patented Jan. 13, 1925.

1,523,083

UNITED STATES PATENT OFFICE.

WILLIAM W. ROBINSON, OF CHATTANOOGA, TENNESSEE.

IMPLEMENT HANDLE.

Application filed June 23, 1924. Serial No. 721,693.

*To all whom it may concern:*

Be it known that I, WILLIAM W. ROBINSON, a citizen of the United States, residing at the city of Chattanooga, in the county of Hamilton and State of Tennessee, have invented certain new and useful Improvements in Implement Handles, of which the following is a specification.

My invention relates to an improvement in implement handles, such as are used in shovels, spades and the like, and it is an improvement on the handle shown in United States Letters Patent No. 906,462, dated December 8, 1908.

The invention belongs to that class of handles known as a D or hand hold attachment for such shovels, spades, and the like.

The object of the invention is to form as one element, a metal D having the opposite sides formed preferably of two pieces of metal, each having its edge turned upon itself as shown, and the other element or shank of each piece being curved to a little less than one half a circle in cross-section, such curved portions or shanks being adapted to clutch the ends of a wooden handle between them; and the folded portions are bent to such shape as will form the proper size for a hand hold, and the outer ends of such folded and curved portions are united by a hand piece, preferably made of wood and is secured to such curved portions by an elongated pin or rivet. The shank portions are fitted to the end of the wooden handle and secured thereto by rivets. The curved parts and the shanks are formed integral and are complementary parts.

I unite the upper ends of the curved parts with a hand piece, in a novel and unique manner. The complementary parts are formed by me in such a manner that they will be strong and efficient for use, and enhance the appearance of the handle. Thus I form a D handle for implements of marked utility.

Figure 1:
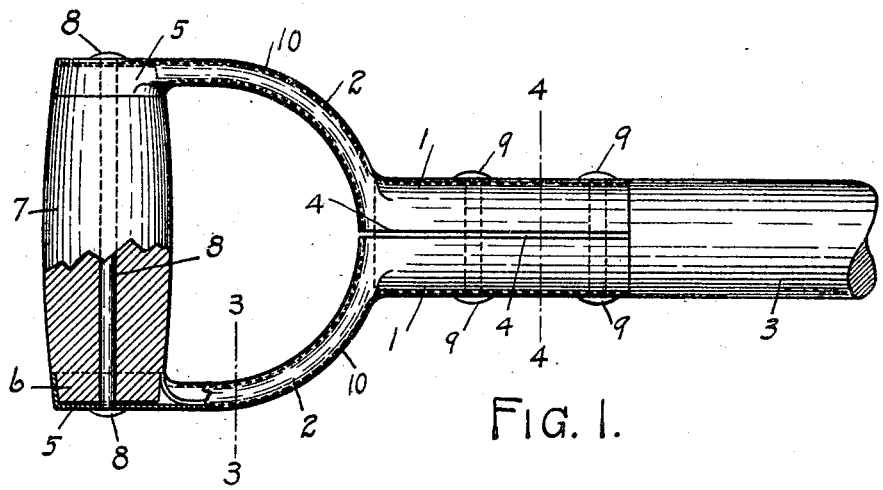
Figure 2:
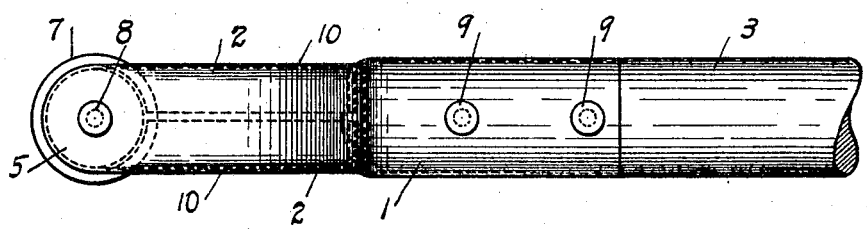
Figure 3:
Figure 4:
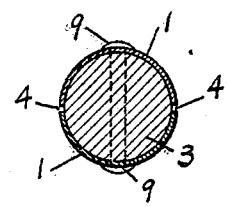

In the accompanying drawings forming a part of this specification:

Fig. 1, is a plan view of the handle, partly broken away, and partly in section, Fig. 2, is a side view in elevation of the handle as shown in Fig. 1, Fig 3, is a section on line 3—3 of Fig. 1, and Fig. 4, is a section on line 4—4 of Fig. 1.

It will be seen from the drawing that each of the complementary parts is composed of the shank member 1, and the curved part member 2, which are made integral. The shank parts 1 each encompass approximately one half of the rounded part of the wooden handle 3, a space 4 being left between them at their meeting parts.

The curved parts 2 each extend outwardly and upwardly and when in proper position are spaced apart as shown in Fig. 1, and at their outer extremities 5 are formed like pockets or recesses into which fit the narrow ends 6 of the wooden crosshandle 7, which handle is held in position in connection with the rounded parts 2 by an elongated pin rivet 8.

The shank parts are held in position by rivets 9.

It will be obvious that these parts can be held together in any other manner.

The metal which forms the rounded parts 2 is bent back upon itself, as shown in Fig. 3, forming hollow ribs 10, widest at the outside, diminishing in width until their ends meet upon the back of the metal onto which they have been turned.

The provisions of recess or pocket-like ends in the extremity of the curved D handle parts add strength to the handle hold and the ends of the wooden handle part 7 being narrowed or contracted, and fitting into said cap parts, the whole held together and in position by the pin bolt 8 forms a very strong and efficient hand hold, keeping the cross handle part 7 from turning, thus allowing a good grip, this construction forming a more efficient handle as it can be used with more efficiency and the same is more convenient for work in the hands of the user.

It will be noticed that the D curved handle parts of the metal which is turned over on itself forms loops which are more arched than other hold handles, thus giving more strength and stability, and also tending to keep the hands of the operator from abrasion or injury.

While I have described the specific construction of this handle, which is the preferred form of making the same, I claim that I may deviate from the exact construction to some extent.

What I claim as new and my invention and desire to secure by Letters Patent is:—

A D handle of the character described, including two complementary sheet metal parts, each consisting of a channel-shaped shank section and a curved outwardly and upwardly extending section, each curved section having the edges of its upper end bent into cup shape, a cross handle having reduced ends extending into the cup-shaped extremities of said complementary parts, the channel-shaped sections being adapted to embrace a shovel shaft, and means for securing the cross handle to the cup-shaped extremities, each of the curved sections having its side edges curved inwardly toward each other and formed into loops, materially rounded on their outer surfaces, the upper ends of said curled edges abutting against said cross handle, and the curled edges extending from the cross handle downwardly to and projecting over the upper end of the shaft to prevent the shaft from moving upwardly relatively to said complementary parts.

In testimony whereof, I affix my signature at Chattanooga, Tennessee, this 13 day of June, 1924.

WILLIAM W. ROBINSON.